United States Patent [19]
Ando et al.

[11] Patent Number: 5,568,393
[45] Date of Patent: Oct. 22, 1996

[54] AUTOMATED WAREHOUSE INLOADING/OUTLOADING STORAGE CONTROLLER

[75] Inventors: Yukito Ando; Akira Okura, both of Toyota; Mikio Ito, Aichi, all of Japan

[73] Assignee: Toyota Jidosya Kabushiki Kaisha, Toyota, Japan

[21] Appl. No.: 370,819

[22] Filed: Jan. 10, 1995

Related U.S. Application Data

[63] Continuation of Ser. No. 33,349, Mar. 18, 1993, abandoned.

[30]       Foreign Application Priority Data

Mar. 25, 1992  [JP]  Japan ..................... 4-066547

[51] Int. Cl.$^6$ ............................ G06F 17/00; B65G 69/00
[52] U.S. Cl. ............... 364/478.02; 364/403; 364/468.01; 364/564; 414/786
[58] Field of Search ..................... 364/401, 402, 364/403, 424.02, 424.07, 468, 478, 564; 414/799, 786, 927, 929, 930

[56]            References Cited

U.S. PATENT DOCUMENTS

| | | | |
|---|---|---|---|
| Re. 33,416 | 10/1990 | Konishi et al. | 364/478 |
| 3,613,910 | 10/1971 | Weir | 214/16.4 A |
| 3,705,410 | 12/1972 | Kooy et al. | 364/403 |
| 4,088,237 | 5/1978 | Brown | 214/152 |
| 4,109,808 | 8/1978 | Hamada et al. | 214/152 |
| 4,428,708 | 1/1984 | Burt | 414/275 |
| 4,527,937 | 7/1985 | Tomasello, Jr. | 414/273 |
| 4,534,692 | 8/1985 | Shiomi et al. | 414/282 |
| 4,692,876 | 9/1987 | Tenma et al. | 364/513 |
| 4,773,807 | 9/1988 | Kroll et al. | 414/282 |
| 5,050,090 | 9/1991 | Golub et al. | 364/478 |
| 5,105,392 | 4/1992 | Stringer et al. | 367/99 |
| 5,147,176 | 9/1992 | Stolzer et al. | 414/786 |
| 5,175,692 | 12/1992 | Mazouz et al. | 364/478 |
| 5,271,703 | 12/1993 | Lindquist et al. | 414/268 |
| 5,273,392 | 12/1993 | Bernard, II et al. | 414/786 |
| 5,282,712 | 2/1994 | Lichti, Sr. et al. | 414/331 |

FOREIGN PATENT DOCUMENTS

| | | |
|---|---|---|
| 0483379A1 | 11/1991 | European Pat. Off. . |
| 59-12002 | 1/1984 | Japan . |
| 61-34504 | 3/1986 | Japan . |
| 62-121108 | 6/1987 | Japan . |
| 2-152802 | 6/1990 | Japan . |

*Primary Examiner*—Kevin J. Teska
*Assistant Examiner*—Leigh Marie Garbowski
*Attorney, Agent, or Firm*—Oliff & Berridge

[57]              ABSTRACT

A picking means for picking goods from pallets removed from a storehouse, and a filling means for filling the pallets with incoming goods and storing them in the storehouse, are connected by a pallet transport means. When goods are to be delivered, the storage space created by picking goods from the pallets is detected. Pallets in which storage space is detected are transported by the transport means to the filling means, where they are filled with incoming goods of sizes which match their storage space, and are then stored in the storehouse. Goods are thereby stored in the storehouse promptly, and the filling density in the storehouse is increased.

8 Claims, 14 Drawing Sheets

| TYPE | DELIV-ERY NO. | TYPE | STRAGE NO. | FILLING COMMAND NO. | STORAGE COMMAND NO. |
|---|---|---|---|---|---|
| A | 10 | A' | 12 | 10 | 2 |
| B | 5 | B' | 3 | 3 | 0 |
| C | 7 | C' | 8 | 7 | 1 |
| D | 8 | D' | 10 | 8 | 2 |

STORAGE PLAN DATA

| TYPE | GOODS DIMENSIONS (x y z) | FILLING COMMAND SEQUENCE |
|---|---|---|
| A4 | 250x400x1350 | 8 |
| A5 | 300x450x1250 | 1 |
| A6 | 300x500x1150 | 4 |
| A7 | 320x450x1200 | – |
| B4 | 200x250x1500 | 9 |
| B5 | 240x260x1700 | 2 |
| B6 | 250x250x1800 | – |
| C3 | 630x700x 160 | 6 |
| C4 | 720x680x 200 | 3 |

DELIVERY PLAN DATA

| PICKING COMMAND SEQUENCE | TYPE | GOODS DIMENSIONS (x y z) |
|---|---|---|
| 1 | A1 | 300x500x1200 |
| 2 | B1 | 250x250x1800 |
| 3 | C1 | 700x700x2000 |
| 4 | A2 | 280x520x1100 |
| 5 | D1 | 500x600x 500 × |
| 6 | C2 | 650x700x 180 |
| 7 | B2 | 400x300x2000 × |
| 8 | A3 | 250x380x1300 |
| 9 | B3 | 200x260x1450 |

INCOMING GOODS ARE SELECTED TO SATISFY THE RELATIONS:

$$\begin{cases} x_1(1-\alpha) \leq x_2 \leq x_1(1-\alpha) \\ y_1(1-\beta) \leq y_2 \leq y_1(1+\beta) \\ z_1(1-\gamma) \leq z_2 \leq z_1(1+\gamma) \end{cases}$$

FOR ALL DELIVERY PLAN DATA. $\alpha, \beta, \gamma$ CAN BE MODIFIED.

Fig. 15

AUTOMATED WAREHOUSE INLOADING/OUTLOADING STORAGE CONTROLLER

This is a continuation of application Ser. No. 08/033,349 filed on Mar. 18, 1993, now abandoned.

BACKGROUND OF THE INVENTION

1. Field of the Invention

This invention relates to an automated warehouse inloading/outloading controller which automatically stores or removes a plurality of goods from a warehouse, and more particularly, to a warehouse inloading/outloading controller wherein storage efficiency is increased by storing and removing pallets accommodating a plurality of goods.

2. Description of the Prior Art

An automated warehouse is a warehouse wherein goods are automatically stored in and removed from the warehouse. In such an automated warehouse, the type, quantity and location of goods transiently stored in the warehouse is normally recorded in a data base, and the warehouse is managed by making use of this data base.

FIG. 1 shows the interior of a typical automated warehouse. A rack 14 housing pallets 13 is installed in the warehouse 11. Goods are accommodated in these pallets 13, and are outloaded from the warehouse 11 by removing the pallets. The outloaded goods are then delivered to various locations outside the warehouse.

The same types of goods are usually contained in the pallets 13. When goods are to be outloaded, a pallet 13 is withdrawn from the rack 14 by a stacker crane 15, and placed on a receiving platform 16. The pallet 13 is then transported outside the warehouse 11 on this platform 16, the goods are removed from the pallet 13, and delivered to various locations outside the warehouse. The operations of searching for a pallet 13 containing goods to be delivered (referred to hereafter as specified goods), and of moving the stacker crane 15 to this pallet, are managed entirely according to the aforesaid data base.

In this type of automated warehouse, the aim has constantly been to increase storage efficiency, and speed up delivery or warehousing of goods. However, due to the practice of housing the same type of goods in one pallet, some pallets were always full while others were practically empty, and the storage efficiency of the warehouse as a whole decreases. Improvements of data base search methods were also desirable so that removal of goods from and storage of goods in the warehouse 11 could be conducted in a timely manner.

SUMMARY OF THE INVENTION

This invention, which was conceived in view of the aforesaid problems, therefore aims to improve the efficiency of operations in an automated warehouse.

In order to achieve this objective, this invention is characterized in that it provides for:

(1) accommodating a plurality of goods types in one pallet, and
(2) recording the amount of storage space that would be created in each pallet based on initial storage space records when deciding which goods are to be outloaded.

It is also characterized in that it provides for:

(3) installing a transport means for transporting the pallets from a goods picking means to a goods filling means directly, and
(4) filling pallets with incoming goods according to the storage space in the pallets transported by the transport means, or filling the pallets with incoming goods according to the storage space of pallets in a storehouse or buffer.

As goods are stored in spaces created by removing goods, storage space in this context is defined as the amount of predetermined space in a pallet created by removing goods from the pallet.

More specifically, the automated warehouse inloading/outloading controller according to this invention is designed for an automated warehouse which also comprises a storehouse housing pallets accommodating a plurality of goods types, a recording means for recording the type and quantity of pallets housed in the storehouse and the type and quantity of goods filling the pallets as stock inventory data, an outloading means for outloading pallets from the aforesaid storehouse, a removal means for removing goods from the pallets taken out of the storehouse, a filling means for filling pallets with new goods coming into the warehouse, a storage means for storing these pallets in the storehouse, and a transport means for transporting pallets from which goods have been removed from the outloading means to the inloading means. This controller is also provided with a computing means for computing the space created in a pallet by removing goods from that pallet (referred to hereafter as storage space) when it is decided which goods are to be outloaded, a space recording means for recording the amount of space in the pallet computed by this computing means, and a selection means for selectively specifying goods according to the amount of space created in the pallet.

The aforesaid computing means is characterized in that it comprises a first occupancy volume computing means for computing occupied pallet space from the width, height and depth of goods unloaded from the pallet, and fills pallets based on the fact that this occupied pallet space becomes fresh storage space in the pallet.

The aforesaid computing means also comprises a second occupancy volume computing means for computing the volume that will be occupied by new goods coming into the warehouse from their width, height and depth. The occupancy volumes computed by the first and second computing means are compared, and if the occupancy volume of goods coming into the warehouse is the same as or less than the occupancy volume of goods removed from it, a command is given to fill the pallets with goods. In this way, the flow of goods is controlled such that the warehouse is filled efficiently and rapidly. Moreover, the closer the occupancy volume of new goods coming into the warehouse is to the occupancy volume of goods removed from the warehouse, the higher the pallet filling density.

The controller is further characterized in that it comprises a removal sequence recording means which records the sequence in which goods are removed from the pallets, a space creation sequence recording means for recording the amount of space created in the pallets which is computed according to processing by the selection means of data entered by the removal sequence recording means, and an incoming goods planning means which decides the sequence of goods coming into the warehouse according to data entered by the space formation sequence recording means.

If a buffer for transient storage of pallets is installed in the aforesaid warehousing means, filling of pallets can be accomplished with greater rapidity.

In the automated warehouse inloading/outloading controller according to this invention having the aforesaid layout, the space created in the pallets when goods leave the warehouse is detected and recorded. When goods come into the warehouse, therefore, they are selectively filled in the pallets according to the space in each pallet which is recorded when it is decided which goods are to be outloaded. Goods of such a size that they can be accommodated in the pallets transported by the transport means are therefore loaded in these pallets, and pallets having a suitable space for new goods are selectively specified. As the pallets transported by the transporting means have a suitable space for the new goods, therefore, loading of the new goods is performed rapidly.

If a buffer for transient storage of pallets is installed in the aforesaid warehousing means, filling of pallets in the storehouse or the buffer takes place simultaneously with goods coming into the warehouse. If pallets from which goods have been unloaded are put in the buffer, therefore, the operation of checking new goods into the warehouse can be performed in a timely manner.

Even if goods are filled in pallets in the storehouse, the filled goods match the amount of storage space created in each pallet, so the efficiency of the automated warehouse as a whole is increased.

If the aforesaid computing means comprises a first occupancy volume computing means, the occupancy volume of goods removed from the pallets is computed from their width, height and depth, and filling of pallets is performed based on the fact that this occupied pallet space becomes fresh storage space in the pallet. The amount of storage space is computed in an identical way according to the size of the goods but regardless of their type, hence the filling operation can be performed rapidly.

If a removal sequence recording means, a space creation sequence recording means and an incoming goods planning means are also provided, the amount of storage space is computed according to processing by the selection means of data obtained by the removal sequence recording means. Space is then allotted by the space creation sequence recording means as it is created, and the sequence of goods coming into the warehouse is decided by the incoming goods planning means according to data provided by the space creation sequence recording means. A plan for bringing goods into the warehouse can thus be drawn up according to the amount of storage space as is it created, and filling of pallets can be performed rapidly and efficiently.

BRIEF DESCRIPTION OF THE DRAWINGS

FIGS. 12, 13, 14 and 15 are drawings describing how goods coming into and leaving the warehouse are selected.

DESCRIPTION OF THE PREFERRED EMBODIMENTS

A preferred embodiment of the invention will now be described. This invention is however not to be construed as being limited to the following embodiment, various modifications that can be implemented by those skilled in the art also being included within the scope and spirit of the invention.

(1) Functional Layout

Figure 1:
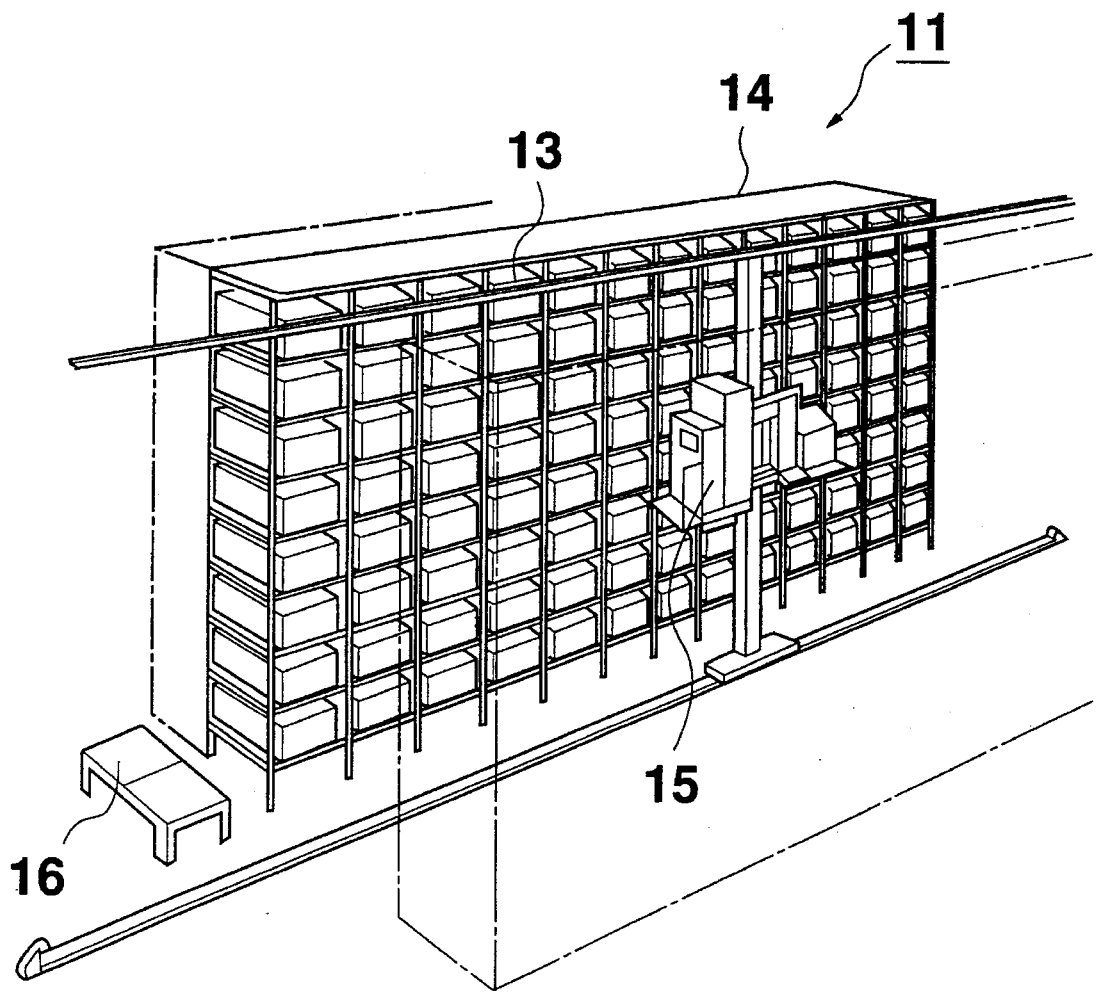
FIG. 1 is a drawing illustrating the layout of a conventional automated warehouse.
Figure 2:
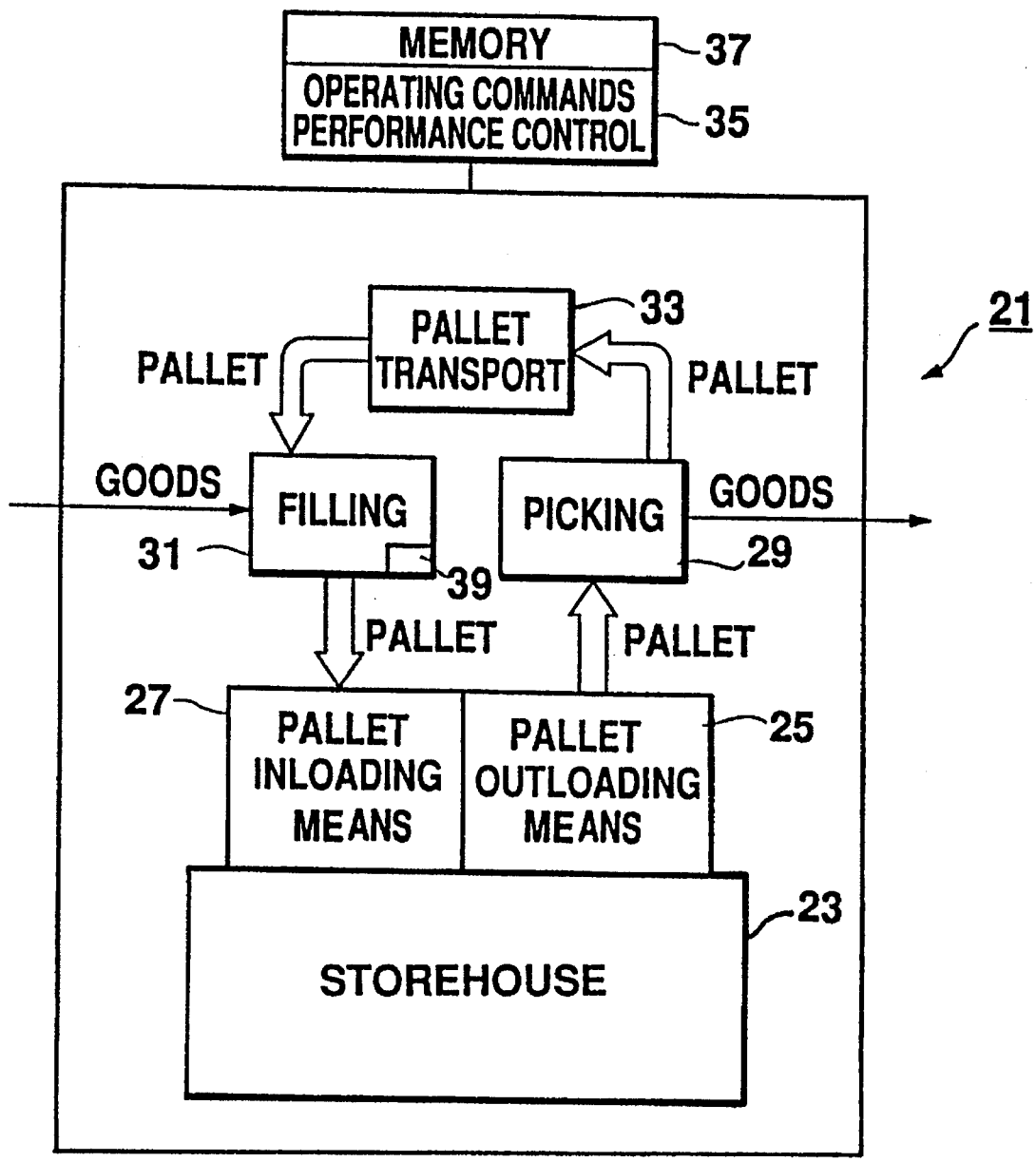
FIG. 2 is a diagram showing the layout of a goods inloading/outloading controller in an automated warehouse according to a preferred embodiment of the invention.

FIG. 2 is a diagram showing the layout of a goods inloading/outloading controller in an automated warehouse according to a preferred embodiment of the invention.

An automated warehouse 21 comprises a storehouse 23 for housing goods, a pallet outloading means 25 for removing goods from this storehouse 23 and a pallet inloading means 27 for bringing goods into the storehouse 23, the inloading of goods into and outloading of goods from the storehouse 23 being performed automatically. Goods are stored in the storehouse 23 by filling pallets as in the prior art. Goods which are to be delivered outside the warehouse (referred to hereafter as outgoing goods) are removed from the storehouse 23 while still in their pallets, and then withdrawn from the pallets by a picking means 29. At the same time, new goods which have arrived from outside (referred to hereafter as incoming goods) are filled in the pallets by a filling means 31, and stored in the storehouse 23 the pallet inloading means 27.

A characteristic feature of the automated warehouse 21 according to this invention is that it comprises a pallet transport means 33 connecting the picking means 29 and the filling means 31, pallets from which goods have been withdrawn being transported by this pallet transport means from the picking means 29 to the filling means 31. The commands initiating these operations and their control are performed by a command control means 35, a memory 37 for memorizing the storage status of the storehouse being installed in this command control means 35.

A buffer 39 is installed in the filling means 31, pallets transported by the pallet transport means 33 being transiently stored in this buffer 39. When goods are brought into the warehouse, pallets stored in this buffer 39 are searched. If there is a pallet in the buffer 39 having a suitable space to accommodate the incoming goods, this pallet is removed from the buffer 39, and the goods are filled in this pallet which is then stored in the storehouse 23. If on the other hand there is no pallet in the buffer 39 having sufficient space to accommodate the incoming goods, the goods are filled in a fresh pallet removed from the storehouse 23 and this pallet is again stored in the storehouse 23. In this automated warehouse 21, therefore, by providing a buffer 39 in which pallets are transiently stored by the aforesaid filling means 31, goods are filled in these transient pallets so that new goods are brought into the warehouse in a timely manner.

Figure 3:
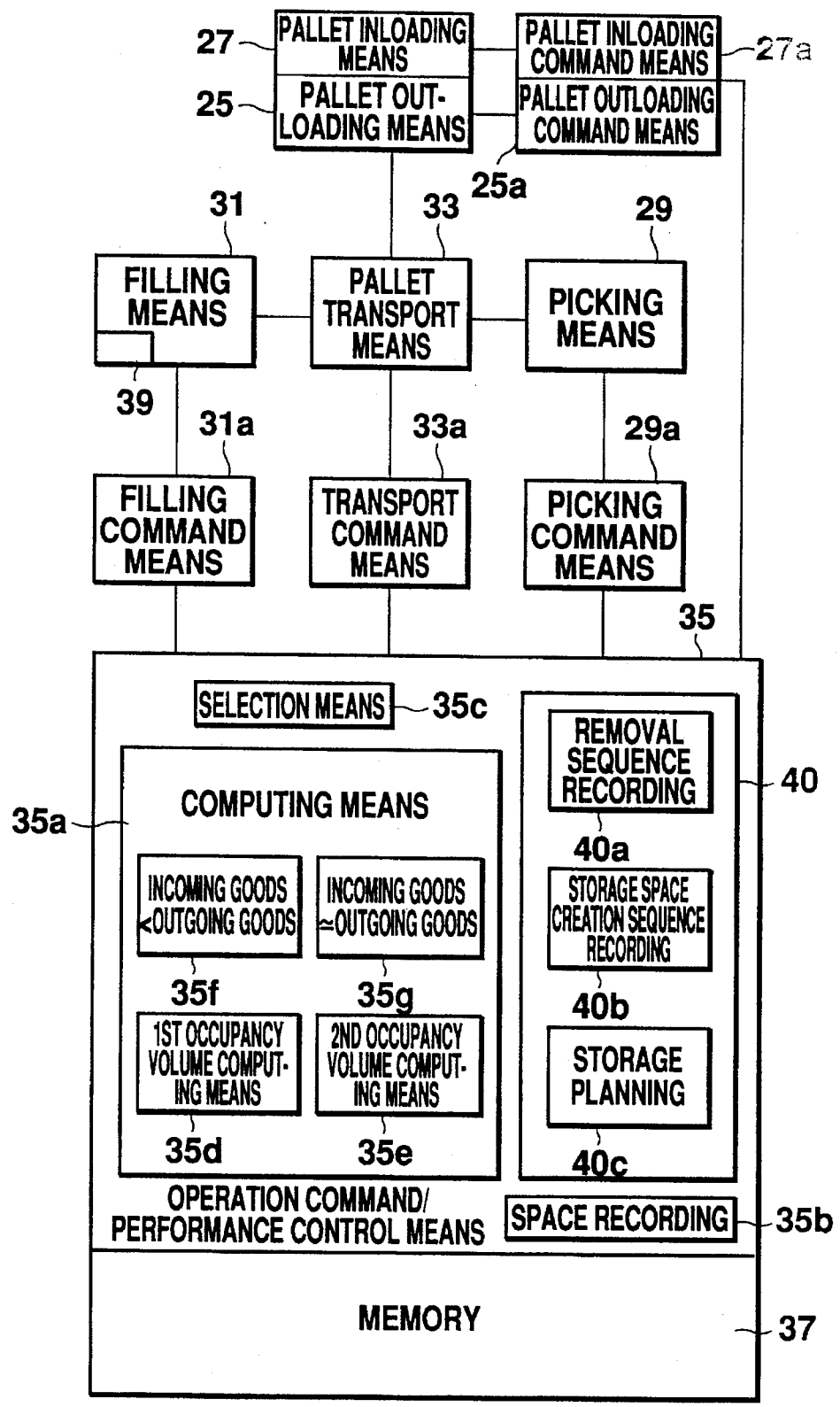
FIG. 3 is a block diagram showing the functional layout of a goods inloading/outloading controller in an automated warehouse according to a preferred embodiment of the invention.

FIG. 3 is a drawing showing the command means corresponding to the means shown in FIG. 2.

As shown in FIG. 3, in the inloading/outloading controller for bringing goods into and removing them from the automated warehouse 21 according to this invention, the filling means 31, picking means 29, pallet outloading means 25 and pallet inloading means 27 are connected by the pallet transport means 33, and to command means respectively corresponding to each of these means. The command control means 35 (goods inloading/outloading controller) manages the warehouse based on information from these command means, and issues operating commands to them.

The command control means 35 comprises a computing means 35a for computing the amount of space that will be created in a pallet by removing goods from the pallet when it is decided to remove goods from the warehouse, a space recording means 35b for each pallet for recording the amount of space computed by the computing means 35a, and a selection means 35c for selectively specifying goods to match the amount of space created in the pallet such that goods which can be stored in the pallets transported by the pallet transport means 33, are filled in these pallets.

The computing means 35a comprises a first occupancy volume computing means 35d for computing the volume occupied by goods removed from a pallet from their width, height and depth, and fills new goods in the pallet based on the fact that this occupancy volume is equal to the amount of space created.

If however the new goods brought into the warehouse are larger than the goods removed from it, they cannot be filled in the pallet. According to this embodiment, therefore, the computing means 35a comprises a second occupancy volume computing means 35e, and it compares the occupancy volume of the incoming goods computed by the second occupancy volume computing means 35e from their width, height and depth with the occupancy volume computed by the aforesaid first occupancy volume computing means 35d. A command means 35f then fills the pallet with the incoming goods if their occupancy volume is smaller than that of the aforesaid removed goods. In this way, the pallet is filled with incoming goods which are smaller than the goods which have been removed.

However, if the pallet is successively filled with incoming goods which are smaller than the removed goods, the filling density might fall. According to this embodiment, therefore, the computing means 35a compares the occupancy volume computed by the aforesaid first occupancy volume computing means 35d with the occupancy volume computed by the second occupancy volume computing means 35e, and is also provided with a command means 35g which, if the occupancy volume of the incoming goods is close to that of the removed goods, issues a command to fill the pallet preferentially with these goods. In this way, incoming goods having effectively the same size (including the case wherein the incoming goods are larger than the removed goods to the extent that they can fill the pallet) as that of the removed goods, are filled. The command control means 35 is further provided with a planning command control means 40 comprising a removal sequence recording means 40a for recording the sequence in which goods are removed from the pallets, a space creation sequence recording means 40b for recording the amount of space in the pallets computed according to processing by the aforesaid selection means of data entered by the removal sequence recording means, and a storage planning means 40c which decides the sequence of goods coming into the warehouse according to the data entered by the space creation sequence recording means. This command control means 35 therefore determines the sequence in which goods are brought into the warehouse according to the goods inloading planning means.

(2) Detailed Layout and Operation

Figure 4:
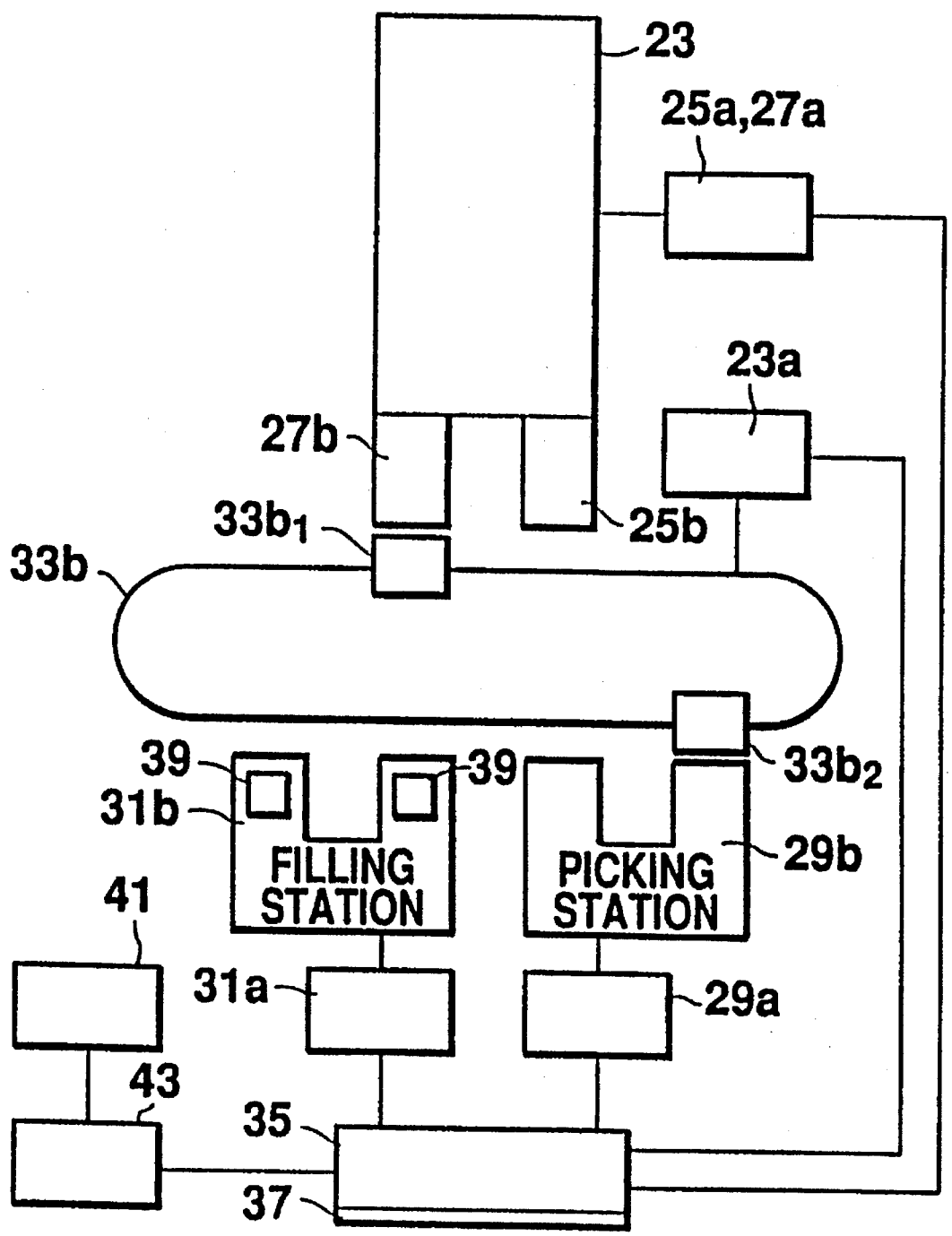
FIG. 4 is a diagram showing the detailed layout of a goods inloading/outloading controller in an automated warehouse according to a preferred embodiment of the invention.

FIG. 4 is a drawing showing the detailed layout of an automated warehouse 21 according to this embodiment.

In FIG. 4, there are installed in the storehouse 23 an outloading conveyor 25b as an outloading means, and an inloading conveyor 27b as an inloading means. The filling means 31 is a filling station 31b, the picking means 29 is a picking station 29b, and the pallet transport means 33 comprises cars 33b1 and 33b2 respectively which move on a rail 33b. These cars are operated by a transport command means 33a. According to commands from the transport command means 33a, the cars on the rail 33 are made to stop in the vicinity of respectively the outloading conveyor 25b, inloading conveyor 27b, filling station 31b and picking station 29b. Also installed are command means 31a, 29, 25a and 27a which respectively correspond to the aforesaid devices and exchange signals with the command control means 35. The storage status of goods in the storehouse is stored as a data base in the memory 37. Goods are delivered outside or brought into the warehouse by a fork lift 41, the operating status of which is displayed on a display 43.

Figure 5:
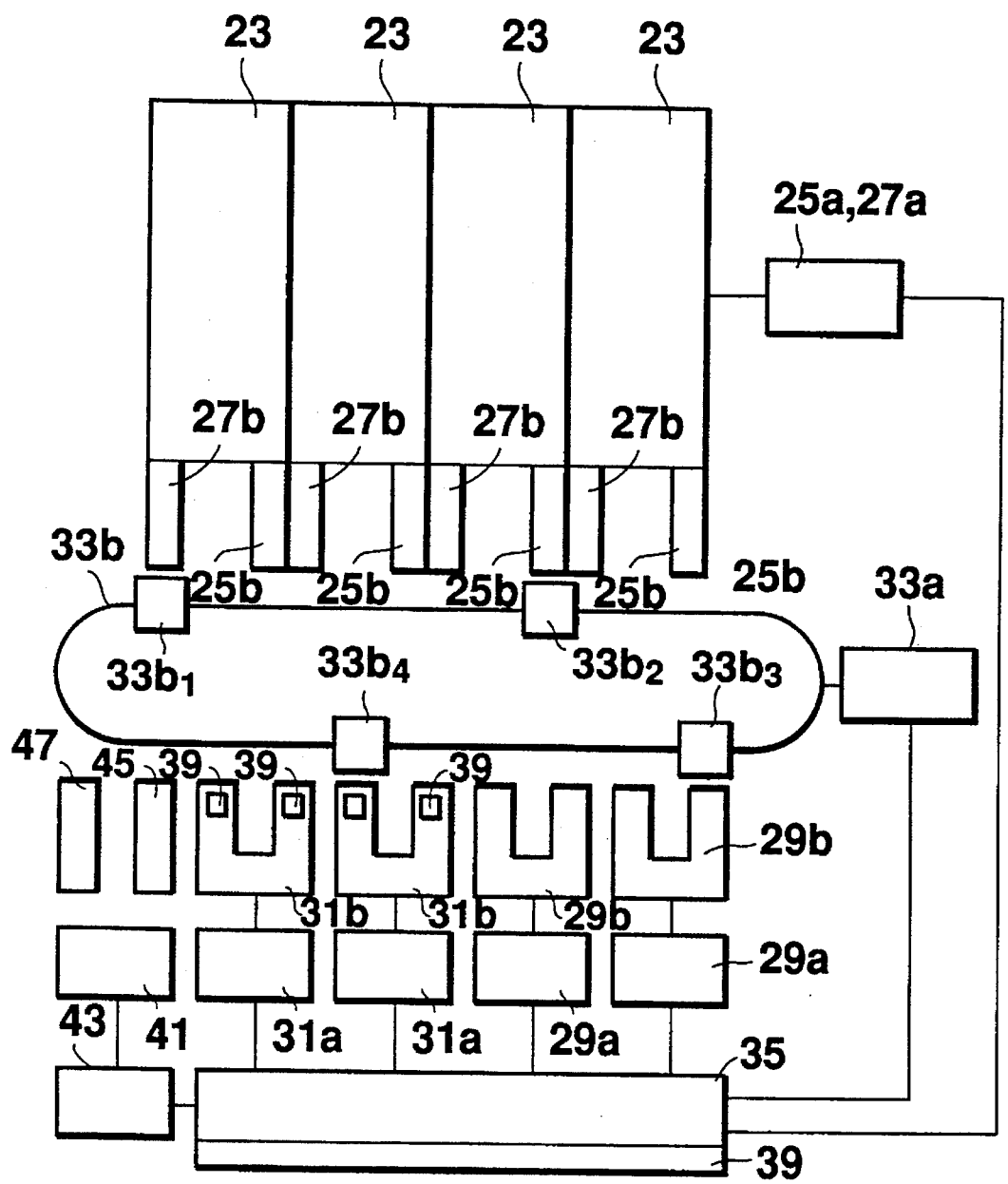
FIG. 5 is a diagram showing one embodiment wherein a plurality of goods inloading/outloading controllers as defined in FIG. 3 are installed in an automated warehouse.

FIG. 5 shows a case wherein there are installed a plurality of terminals of the command control means 35 (inloading/outloading controller) of the automated warehouse 21 shown in FIG. 4. In these figures, corresponding components are indicated by identical symbols.

In this case, the number of cars is equal to the number of storehouses. In the embodiment shown in FIG. 5, an inloading conveyor 45 and outloading conveyor 47 are installed. Goods are transported to the cars via the inloading conveyor 45 by the fork lift 41, and are transported from the cars via the outloading conveyor 47 by the fork lift.

(3) Operations

Figure 6:
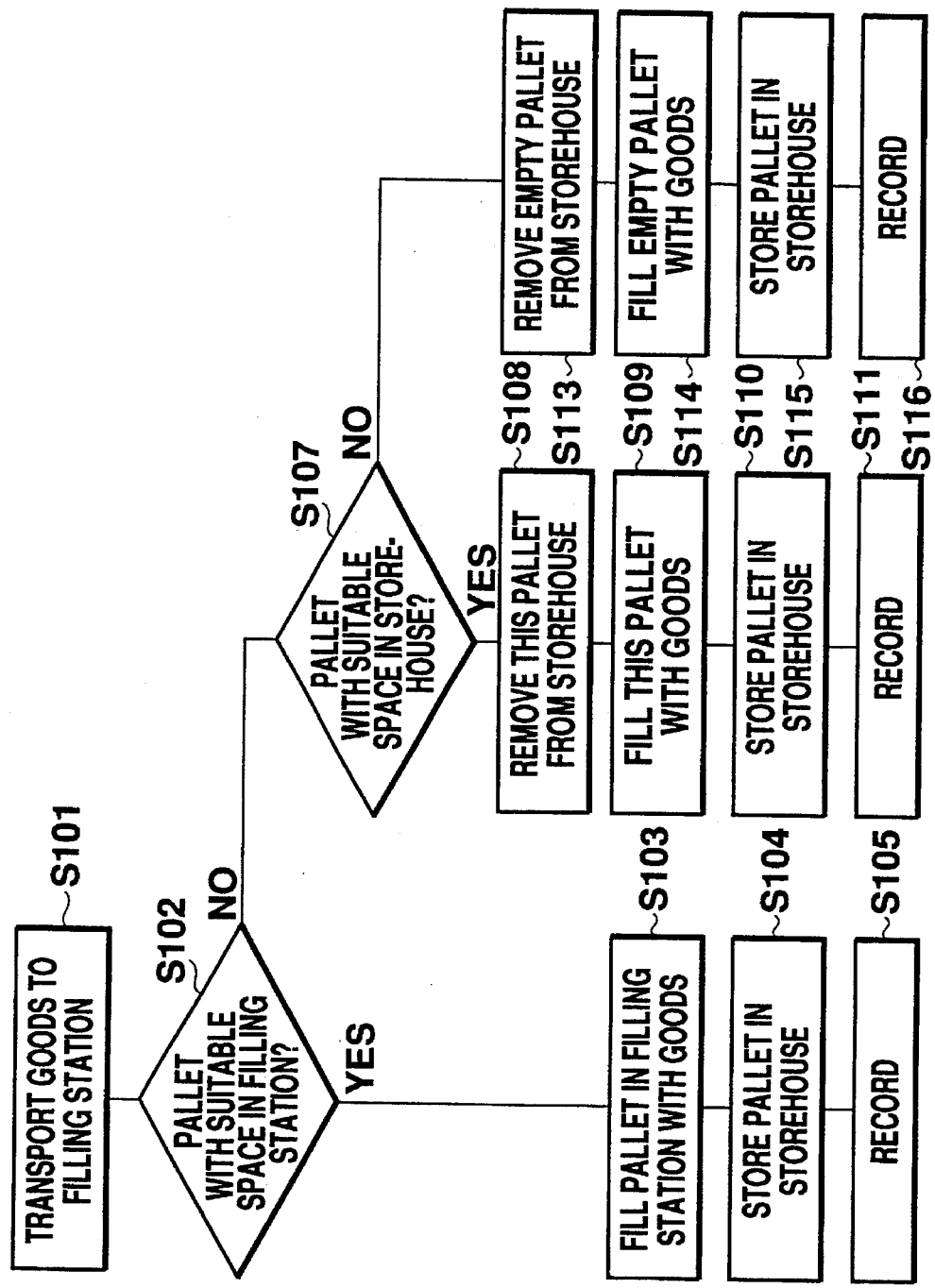
FIG. 6 is a flowchart showing how the goods inloading/outloading controller in an automated warehouse according to the invention organizes the flow of goods into the warehouse.

FIG. 6 is a flowchart showing the operation of the command control means 35 (inloading/outloading controller) in an automated warehouse according to the present embodiment of the invention. Inloading and outloading of goods is performed according to the data base stored in the memory 37.

(a) Inloading

First, when new goods are transported to the filling station 31b (S101), it is verified whether or not a pallet having sufficient space to accommodate the goods is available in the filling station 31b (buffer 39) (S102).

If a pallet having sufficient space is available, this pallet is filled with the goods and inloading takes place (S103, S104). This event is recorded in the data base 37 (S105). Therefore, if a pallet which can accommodate the new goods is in the filling station 31b (buffer 39), this pallet is immediately filled with the new goods and stored in the storehouse 23. Storage is therefore performed in a timely fashion, and the operating efficiency of the automated warehouse 21 as a whole is improved.

If on the other hand no pallet having sufficient space is available at the buffer 39, the data base 37 is searched to determine whether or not a pallet having sufficient space to accommodate the goods is available in the storehouse 23

(S107). If such a pallet is available in the storehouse 23, it is removed from the storehouse (S108) and filled with the new goods (S109). The filled pallet is then stored again (S110), and this event is recorded in the data base 37 (S111). Thus, even if there is no pallet having sufficient space to accommodate the new goods in the filling station 31b (buffer 39), space in pallets in the storehouse is used effectively, the filling density of goods in the storehouse 23 is increased, and the filling efficiency of the automated warehouse as a whole is improved.

If no pallet having sufficient space to accommodate new goods is available in either the filling station 31b or the storehouse 23, a fresh pallet is removed from the storehouse 23 (S113), filled with the goods (S114) and stored again (S115), this event being recorded in the data base 37 (S116).

(b) Outloading

Figure 7:
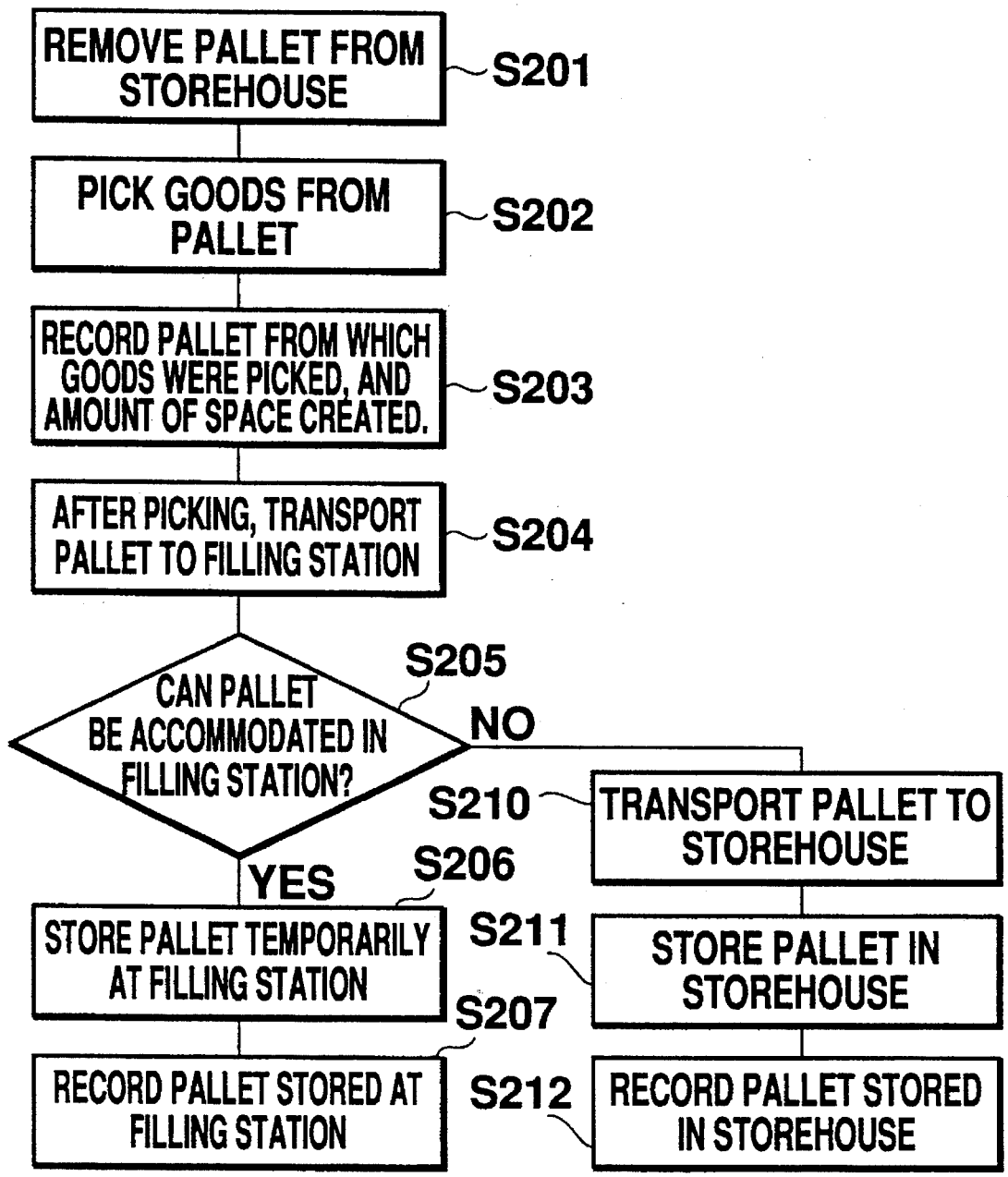
FIG. 7 is a flowchart showing how the goods inloading/outloading controller according to the invention organizes the flow of goods out of the warehouse.

FIG. 7 is a flowchart showing the flow of operations during outloading.

First, a pallet is removed from the storehouse 23 by the outloading conveyor 25b (S201), and the goods to be outloaded are then picked from the pallet at the picking station 29b (S202). When goods are picked from the pallet, a corresponding amount of storage space is created in the pallet, it being a characteristic feature of this embodiment that the size of this new space is recorded for each pallet (S203). Pallets from which goods have been picked off, and for which the amount of storage space has been recorded, are sent to the filling station 31b by the transport means 33 (S204).

When a pallet is transported to the filling station 31b, it is detected whether or not the pallet can be accommodated in the filling station, i.e. whether or not it can be stored in the buffer 39 (S205).

If it is judged that the pallet can be accommodated, it is stored in the buffer 39 (S206), and it is recorded that a predetermined pallet is being stored in the buffer 39. As mentioned hereinbefore, the amount of space created in the pallet is recorded for each pallet (S207).

If on the other hand it is judged in the step S205 that the pallet cannot be accommodated in the buffer 39, the pallet passes through the filling station 31b without stopping and is transported to the storehouse 23 (S210). The pallet is then stored in the storehouse (S211), and it is recorded that the pallet passed through the filling station 31b without stopping to be stored in the storehouse 23 (S212).

Overall Operation

Figure 8:
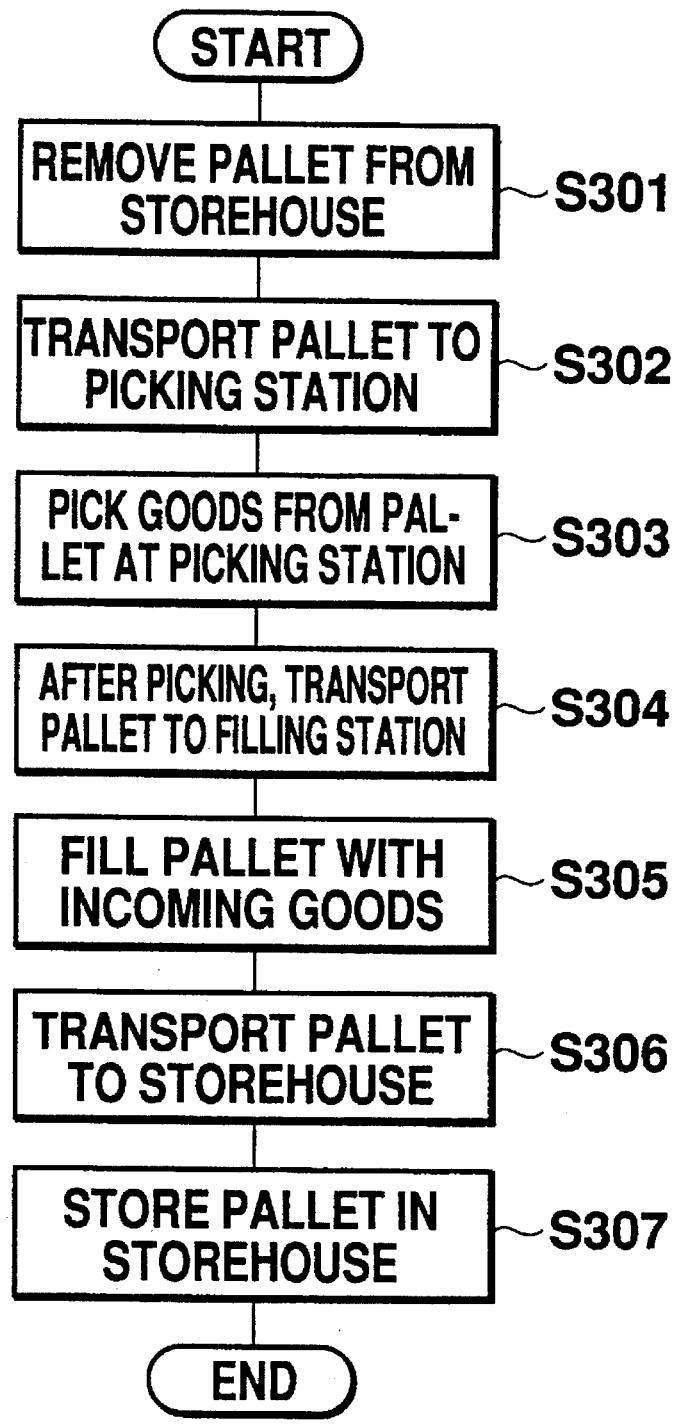
FIG. 8 is a flowchart showing the overall flow of operations performed by the goods inloading/outloading controller according to the invention.

FIG. 8 shows the flow of operations from removing a pallet to storing a pallet.

When a pallet is removed from the storehouse 23 (S301), this pallet is transported to the picking station 29 (S302) where the goods to be delivered are picked from the pallet (S303). The space created by removing these goods from the pallet is recorded, and the pallet is transported to the filling station 31b by the pallet transport means 33 (S304). In this filling station 31b, the pallet is filled with incoming goods (S305). The pallet filled with goods is then transported to the storehouse 23 (S306), and when this pallet enters the storehouse, it is deemed that the goods have been warehoused (S307).

(4) Embodiment 2

Figure 9:
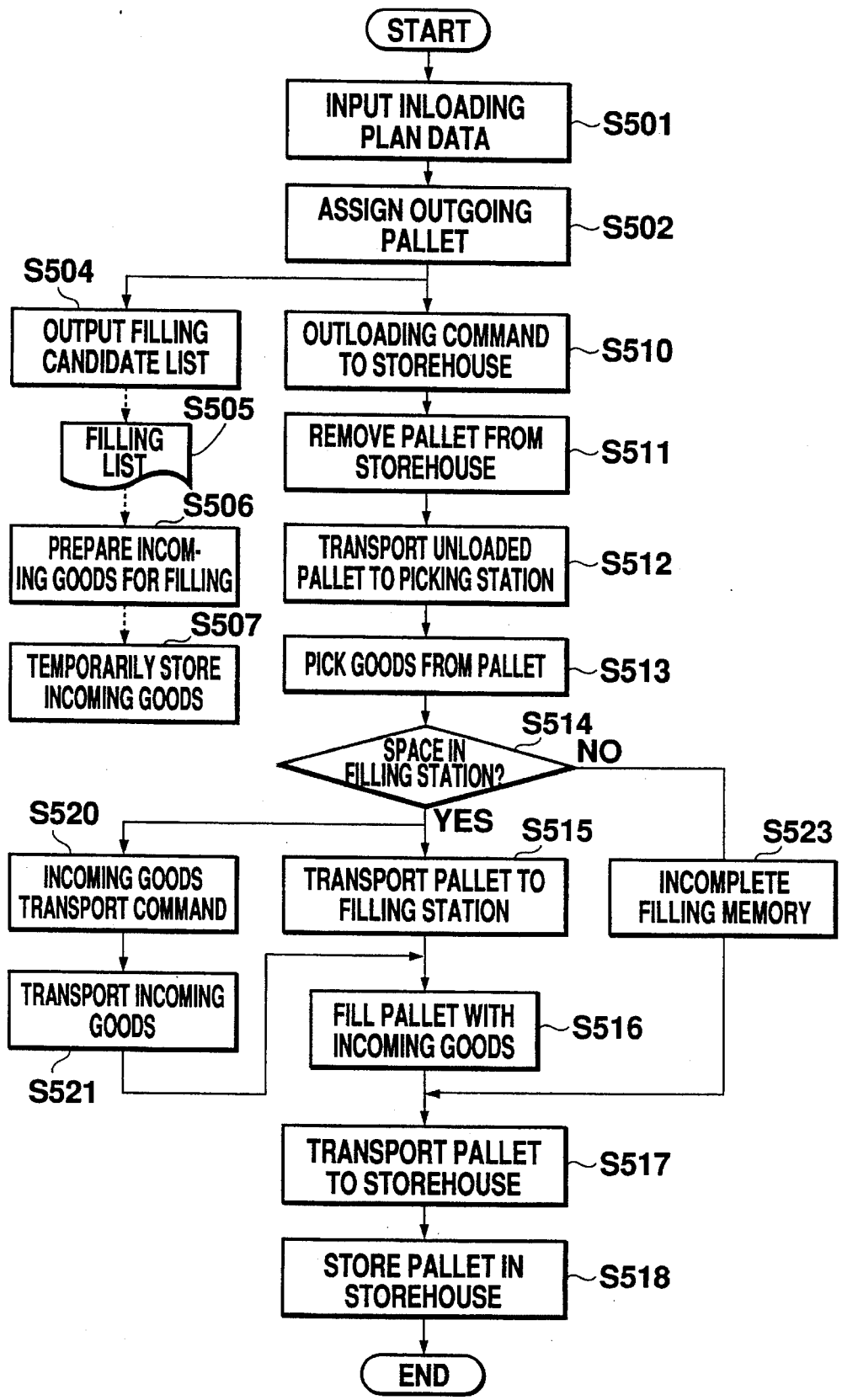
FIG. 9 is a flowchart showing the flow of operations when it is decided to deliver goods outside the warehouse.

FIG. 9 is a flowchart describing the operations in a second embodiment of the invention. This figure shows the entire sequence of operations from removal of goods to detection/recording of storage space, and from filling of incoming goods to warehousing of pallets.

This second embodiment is characterized in that, instead of detecting/recording the amount of storage space created in the pallet when the goods to be delivered are removed, the aforesaid storage space is detected/recorded based on set delivery plan data, and filling of incoming goods is performed based on this data.

This plan is executed by the plan command means 40 in the command control means 35. More specifically, a warehousing plan is devised by the storage planning means 40c as described hereinafter with reference to a goods removal sequence recorded by the removal sequence recording means 40a, and a space creation sequence recorded by the space creation sequence recording means 40b, and warehousing of goods takes place according to this plan.

(5) Delivery and Storage Space Records (a) Delivery Plan Data Input and Assignment of Outgoing Pallets Firstly, when a delivery of goods is requested, this information is input as delivery plan data (S501). Pallets containing the goods to be delivered are searched, and pallets which are to be removed are assigned (S502).

These operations are divided into a line for delivering goods, and a line for provisionally storing incoming goods. By provisionally storing incoming goods, these goods can be immediately filled in pallets transiently stored in the buffer 39.

(b) Generation of Filling List and Provisional Storage of Incoming Goods

The amount of storage space, and the type and quantity of goods stored in the pallet, are first recorded in the data base. When a pallet to be outloaded is assigned in S502, the type and quantity of goods stored in the pallet, and the type and quantity of goods to be picked from it, are simultaneously identified. The amount of storage space that will be created can therefore be computed, and if the size of the incoming goods is known, it is possible to determine the pallet in which these goods should be filled.

A prerequisite for performing the aforesaid judgment is the drawing up of a filling candidate list in S504 based on the amount of space in corresponding pallets computed from assigned pallet and delivery plan data. A filling list is drawn up based on the candidate list (S505), and incoming goods are prepared based on this filling list (S506). As temporary storage of incoming goods takes place according to this process, it is therefore based on the filling list drawn up in S505 (S507). Specific examples of the filling list are given hereinafter.

Temporary storage of incoming goods can be easily accomplished if part of the buffer 39 in the filling station 31b is used.

(6) Delivery of Goods and Transport of Pallets after Picking (a) Deliveries

When goods are to be delivered, an outloading command is issued by the storehouse after the outgoing pallet has been assigned (S510). The pallet is removed from the storehouse 23 by the outloading conveyor 25b (S511) and transported to the picking station 29b (S512), where the relevant goods are removed from it (S513). Goods thus removed from the pallet at the picking station 29b are then delivered to various locations outside the warehouse.

(b) Transport of Pallet after Picking of Goods

The pallet from which goods have been picked is transported to the filling station 31b by the pallet transfer means 33. Before this pallet reaches the filling station 31b, it is judged whether or not there is sufficient space to accommodate the pallet in the buffer 39 in the filling station 31b (S514).

If there is sufficient space to accommodate the pallet in the filling station 31b, the pallet is transported to the filling station 31b (S515) where filling takes place (S516). The filled pallet is then transported to the storehouse 23 (S517), and stored (S518).

Incoming goods are also transported at the same time (S520) as pallets are being transported to the filling station (S515). Commands to transport incoming goods are issued based on the amount of storage space in pallets transiently stored in the filling station 31b (buffer 39). As pallets from which goods have been picked reach the filling station 31b, goods having a size most suited to the storage space in the pallets in the buffer 39 also reach the filling station 31b, and filling is therefore performed rapidly and smoothly.

If on the other hand it is judged that there is insufficient space in the filling station to accommodate the pallet (S514), the pallet passes through the filling station 31b and is transported to the storehouse 23 for storage without filling being carried out. It is then recorded that a pallet which has not been filled has been stored (S523).

(7) Improvement of Filling Rate

As described hereintofore, there are some pallets in the storehouse 23 which have passed through the filling station 31b without being filled. Goods are therefore scattered throughout the pallets stored in the storehouse 23, which would normally lead to a decrease of filling density of the automated warehouse.

Figure 10:
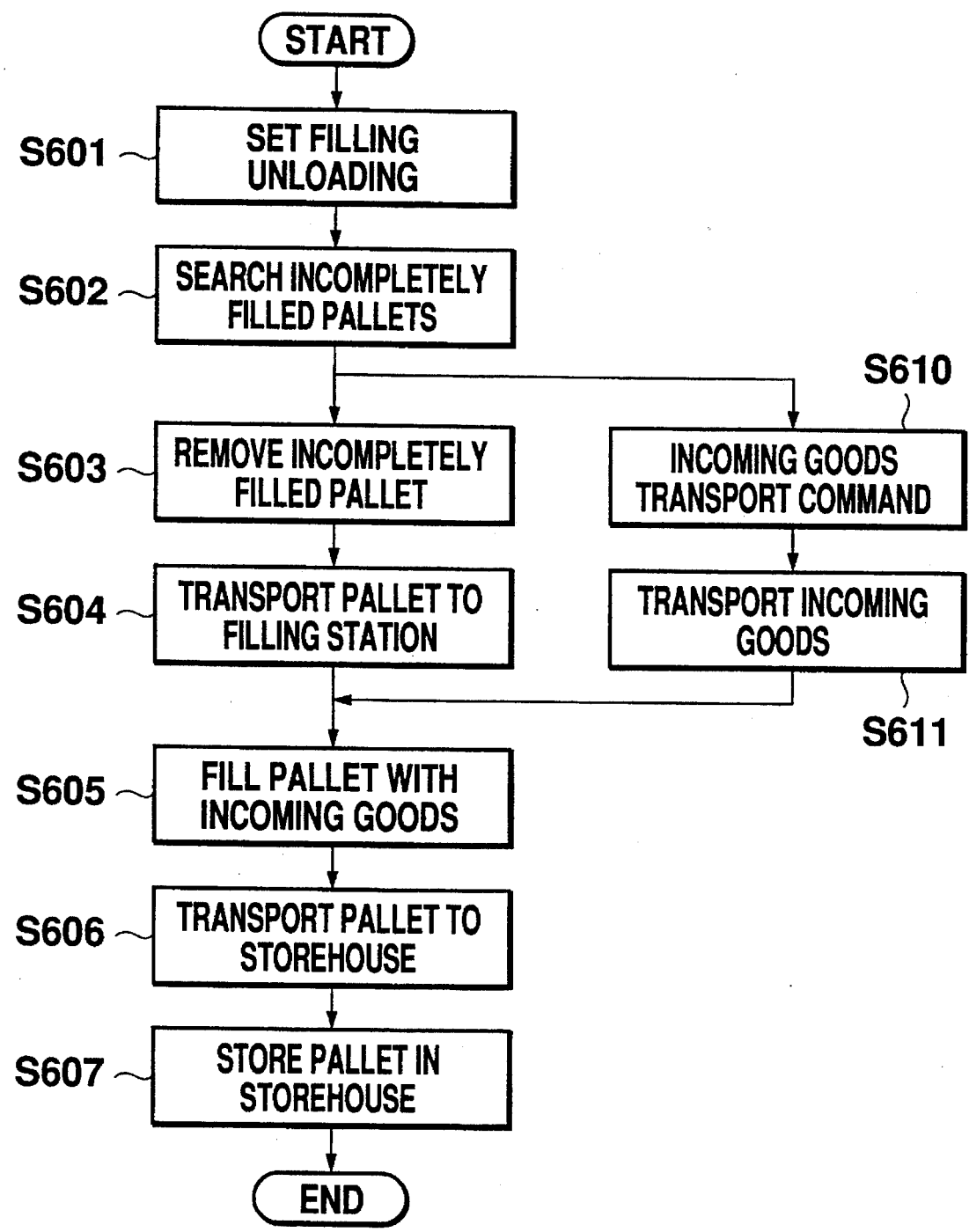
FIG. 10 is a flowchart showing the flow of filling operations to increase the filling density in an automated warehouse.

According to this embodiment, however, by means of the control scheme shown in FIG. 10, the filling density in the automated warehouse can be increased and the goods in the storehouse 23 arranged at the same time. One example of control which aims to increase the filling density of the warehouse will now be described.

When a request is made to increase the filling density (S601), pallets in the storehouse 23 which are not completely full (referred to hereafter as incompletely filled pallets) are searched for (S602), and an incompletely filled pallet is removed (S603). This incompletely filled pallet is transported to the filling station 31b (S604), where it is filled with incoming goods (S605). The pallet filled with incoming goods is then transported to the storehouse 23 (S606) and stored (S607). Thus, when there is a request to increase the filling density, incompletely filled pallets are preferentially unloaded each time goods come in, and by filling these incompletely filled pallets with the goods, the filling density can be increased.

At the same time, when the incompletely filled pallet is searched for in S602, a command is issued to transport incoming goods which match the amount of storage space created in this incompletely filled pallet (S610), and goods are transported according to this command (S611).

When an incompletely filled pallet is transported to the filling station 31b, incoming goods which match the amount of space in this pallet are also transported to the filling station 31b. Filling in S605 is therefore performed rapidly and smoothly.

Figure 11:
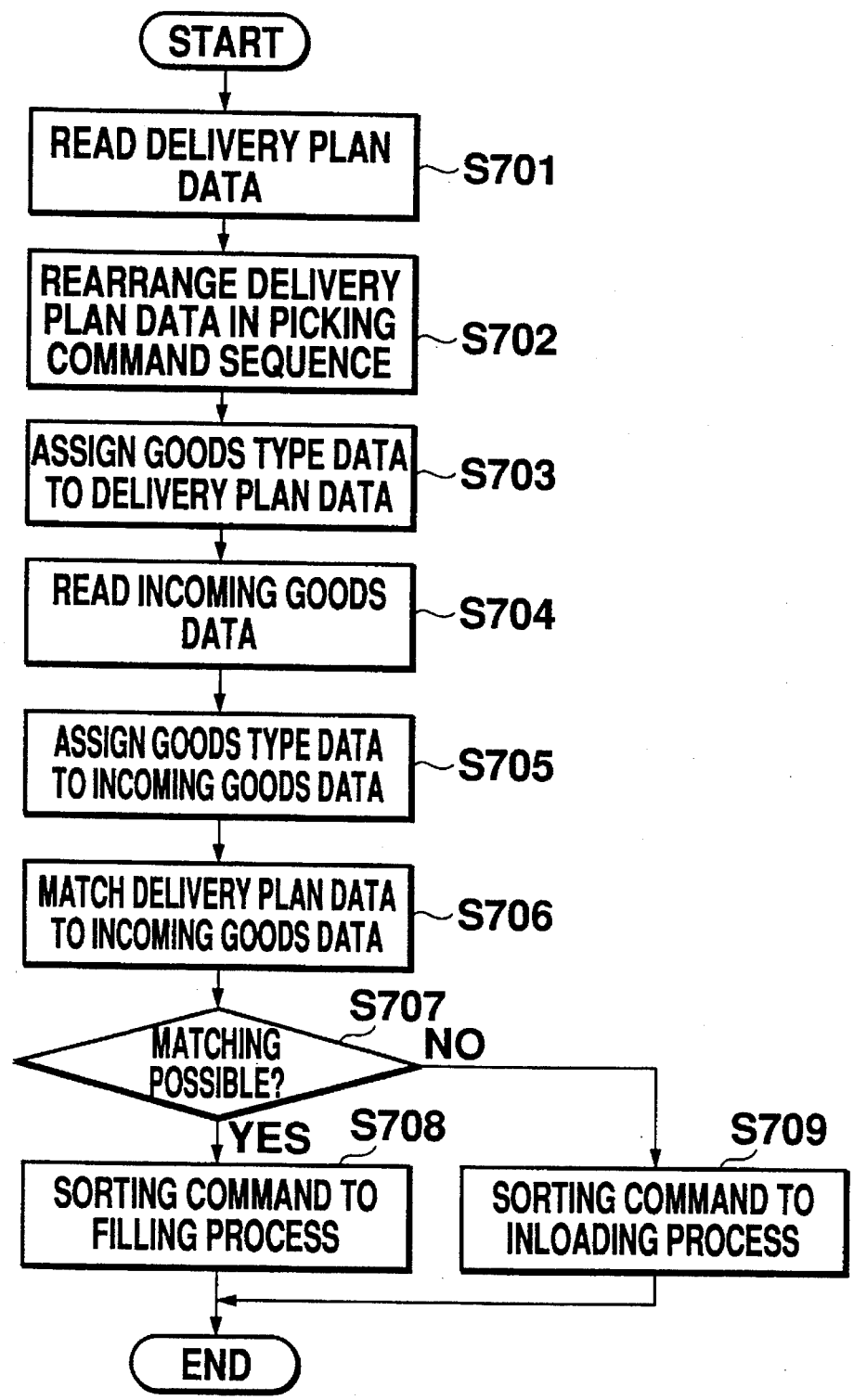
FIG. 11 is a flowchart showing the flow of operations when it is decided to deliver goods outside the warehouse, and bring new goods into the warehouse.

(8) Generation of Filling List and Transient Storage of Incoming Goods (a) Transient Storage of Incoming Goods FIG. 11 is a flowchart showing the detailed process from the output of a filling candidate list to the transient storage of incoming goods, S504 to S507 in FIG. 9.

First, delivery plan data is read (S701), this data is rearranged according to a goods picking command sequence (S702), and goods type data is added to the delivery plan data (S703). If a request to bring goods in is received in this state, incoming goods data is read (S704), and goods type data is added to this data (S705).

In S706, the outgoing goods data is made to correspond and is matched to production plan data. In other words, the sizes of the goods to be delivered and the goods to be warehoused are compared (S707), and if they are essentially the same, the pallet from which goods are to be delivered is filled with incoming goods which match the size of the outgoing goods (S708).

If on the other hand, there are no outgoing goods of which the size corresponds to the incoming goods, a fresh pallet is filled with the incoming goods which is then stored in the storehouse 23 (S709).

(b) Filling List (1) Goods

Figure 12:
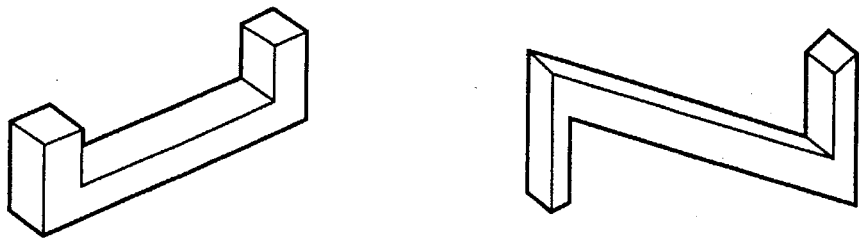
Figure 12:
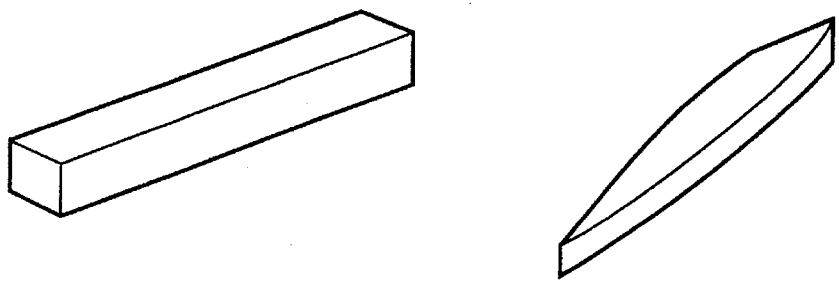
Figure 12:
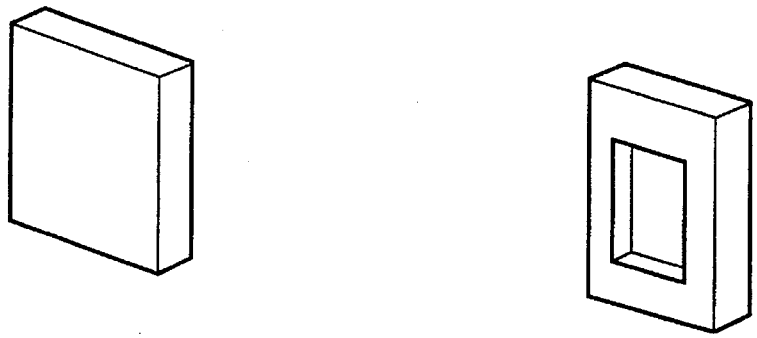

FIGS. 12–15 describe the processes from S706 to S709 in greater detail. In FIG. 12, A and A' refer to goods having different shapes but essentially occupying the same volume. This volume can be easily judged from the area calculated from the width and height, and the depth. Similarly, B and B' essentially occupy the same volume, and C and C' essentially occupy the same space. Pallets from which goods of type A have been picked can therefore be filled with goods of type A', pallets from which goods of type B have been picked can be filled with goods of type B', and pallets from which goods of type C have been picked can be filled with goods of type C'.

(2) Matching of Goods

Figures 13, 14:
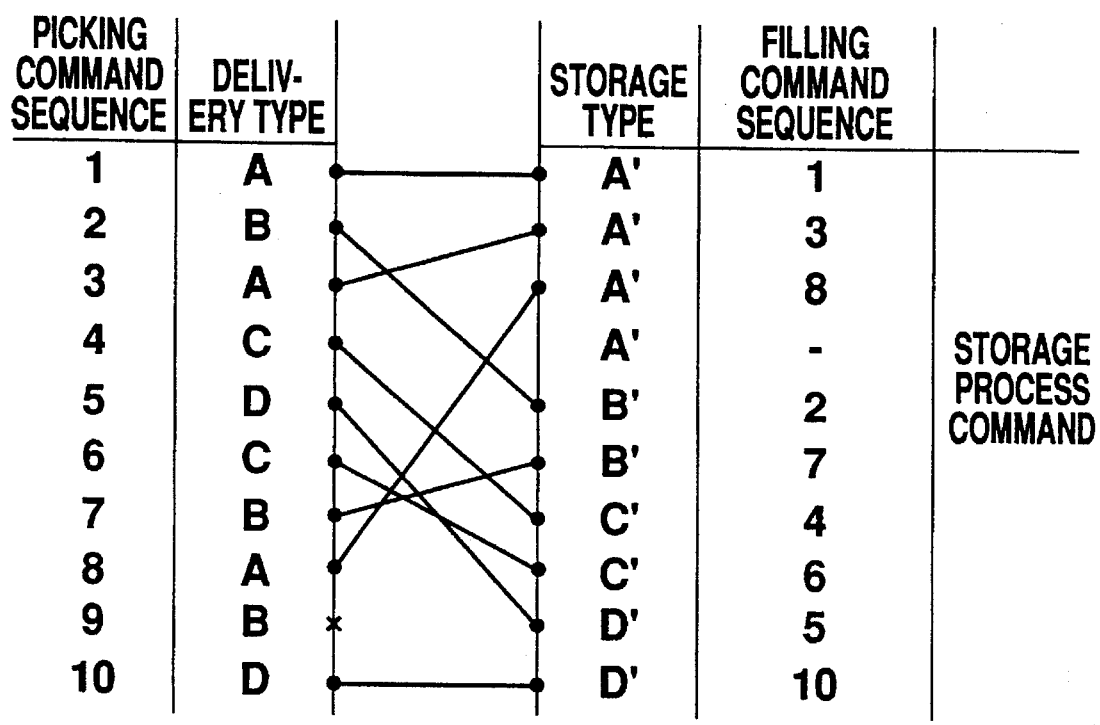

As shown in FIG. 13, if 10 goods of type A are to be delivered and there are 12 incoming goods of type A', 10 goods of type A' can be filled in the pallet from which the goods A were picked, the remaining 2 goods of type A' being stored in a fresh pallet. If the number of goods that can be accommodated in a pallet after picking is defined as a filling command number, and the number of goods required to be stored in empty pallets is defined as a storage command number, the filling command number in this case is 10 and the storage command number is 2. Similarly, if the number of goods of type B to be delivered is 5 and the number of incoming goods of type B' is 3, the filling command number is 3 and the filling command number is 0.

By computing a filling command number and storage command number in this way, a filling command sequence can be set up according to the picking command sequence in FIG. 14. For example if in FIG. 14 there are 4 goods of type A', and 2 each of types B', C' and D', the filling command sequence is set up accordingly as shown.

(3) Rearrange of Data Sequences

Describing this situation in further detail, if the first type of goods to be picked is A, a command is issued to fill the corresponding type A' first. If the second type of goods picked is B, a command is issued to fill the corresponding type B' next. Similarly, if a command is issued to pick type A third, A' is specified from the remaining goods types and a command is issued to fill A' in third place. In such a case, if a command is issued to pick type B in 9th place, as there are no more goods of type B' corresponding to this type B in the incoming goods, no goods can be filled in the pallet after B has been picked. If B is outloaded in 9th place, therefore, this pallet is returned to the storehouse 23 without being filled. Regarding type A', if no goods of the corresponding type A have been delivered, the pallet is transiently stored in the filling station 31b. These incoming goods A' which have been transiently stored are then filled in a fresh pallet in which space is created when a delivery of type A is made from that pallet.

(9) Dimensions of Good and storage Space

Here, the type of goods to be accommodated in the storage space created by pickling goods from a pallet is based on a decision as to whether or not the dimensions of the goods are within preset tolerances.

For example, as shown in FIG. 15, the goods are divided into groups A, B, C and D. The basic dimensions of group A are preset to 300 mm×500 mm×1200 mm. Goods for which height and width are within ±50 mm and depth is within ±100 mm tolerance of these limits, are considered as belonging to Group A. Similarly, the basic dimensions of group B are preset to 250 mm×250 mm×1800 mm, the basic dimensions of group C are preset to 700 mm×700 mm×200 mm, and the basic dimensions of group D are preset to 500 m×600 mm×500 mm. After delivering A1, therefore, a search is made for incoming goods in Group A, and a stockpiling command sequence is set up starting from those goods in Group A which are closest to A1. In Group A, the groups A4 to A7 of the incoming goods correspond to A1, but as A5 has the same width and is filled the most quickly, A5 is chosen first in the stockpiling sequence. Similarly, B5 is specified for B1, and the incoming goods type B5 is specified as second in the stockpiling sequence. The tolerances In these dimensions can be freely set according to the state of the pallet, type of goods or type and state of packing. Further, by making correspondences between delivery plan data and storage plan data, efficient inloading/outloading can be rapidly performed.

In the inloading/outloading controller of the automated warehouse according to this invention, therefore, the storage space created in pallets when goods are removed is detected, and incoming goods are accommodated in this space so that storage operations are promptly carried out. Further, by accommodating goods of different types which match the storage space created by picking goods from the pallets, the storage efficiency of the automated warehouse is increased.

What is claimed:

1. An automated warehouse comprising:

a storehouse for storing pallets, said pallets storing a plurality of types of goods;

storage means for storing pallets in said storehouse;

recording means for recording the types and quantities of pallets stored in the storehouse, and the types, quantities and volumes of goods filling the pallets for each of the pallets as inventory data;

outloading means for outloading pallets from said storehouse;

picking means for picking outloaded goods from outloaded pallets, wherein said outloading means is positioned between said picking means and said storehouse;

filling means for filling incoming goods each having a predetermined volume in said outloaded pallets, said filling means including buffer means for temporarily storing outloaded pallets until an occupancy volume of incoming goods is matched with the available storage space on an outloaded pallet;

transporting means for transporting pallets from which outloaded goods have been picked by said picking means and pallets from said buffer means to said filling means; and an inloading/outloading controller for controlling each of the aforesaid means wherein said inloading/outloading controller includes computing means for computing the occupancy volume of incoming goods based on data of the incoming goods and for computing the amount of available storage space created in a pallet for each of the pallets when outloaded goods have been picked from the pallet based on data of the goods which have been picked by said picking means, space recording means for recording the amount of available storage space in a pallet for each of the pallets computed by the computing means, and selection means for selectively specifying incoming goods having an occupancy volume that is approximately equal to or smaller than the amount of available storage space created in an outloaded pallet such that said filling means fills incoming goods in the available storage space on the outloaded pallets, wherein when a pallet suitable for accommodating incoming goods is not in the buffer means, the inloading/outloading controller searches for a suitable pallet from the pallets in the storehouse and carries the pallet to the filing means for accommodating the incoming goods.

2. An automated warehouse as defined in claim 1, wherein said computing means of said inloading/outloading controller includes a first occupancy volume computing means for computing the occupancy volume of outloaded goods removed from an outloaded pallet from a width, height and depth of said outloaded goods, and wherein said selection means specifies incoming goods based upon the computed occupancy volume of outloaded goods removed from the outloaded pallet.

3. An automated warehouse as defined in claim 2, wherein said computing means of said inloading/outloading controller comprises:

second occupancy volume computing means for computing an occupancy volume of incoming goods from a width, height, and depth of said incoming goods; and a command controller that compares the occupancy volume computed by said first occupancy volume computing means and the occupancy volume computed by said second occupancy volume computing means, and if said occupancy volume of said incoming goods is smaller than said occupancy volume of outloaded goods, said selection means specifies that the outloaded pallet is filled by said filling means with said incoming goods.

4. An automated warehouse as defined in claim 2, wherein said computing means of said inloading/outloading controller comprises:

second occupancy volume computing means for computing an occupancy volume of incoming goods from a width, height, and depth of said incoming goods; and a command controller that compares the occupancy volume computed by said first occupancy volume computing means and the occupancy volume computed by said second occupancy volume computing means, and if said occupancy volume of said incoming goods is approximately equal to said occupancy volume of outloaded goods, said selection means specifies that the outloaded pallet is filled by said filling means with said incoming goods.

5. An automated warehouse as defined in claim 1, further comprising planning command means, said planning command means comprising:

removal sequence recording means for providing, as data, the occupancy volume of outloaded goods and the sequence in which outloaded goods are removed from an outloaded pallet;

storage space creation sequence recording means for recording the amount of available storage space in the outloaded pallets in the sequence in which the storage space was created from the data entered by said removal sequence recording means; and storage plan design means for deciding the sequence in which incoming goods are to be stored for optimizing the use of the available storage space on a pallet according to data entered by said storage space creation sequence recording means.

6. An automated warehouse as defined in claim 5, wherein said computing means of said inloading/outloading controller includes a first occupancy volume computing means for computing the occupancy volume of outloaded goods removed from an outloaded pallet from a width, height and depth of said outloaded goods, and wherein said selection means specifies incoming goods based upon the computed occupancy volume of outloaded goods removed from the outloaded pallet.

7. An automated warehouse as defined in claim 6, wherein said computing means of said inloading/outloading controller comprises:

second occupancy volume computing means for computing an occupancy volume of incoming goods from a width, height, and depth of said incoming goods; and a command controller that compares the occupancy volume computed by said first occupancy volume computing means and the occupancy volume computed by said second occupancy volume computing means, and if said occupancy volume of said incoming goods is smaller than said occupancy volume of outloaded goods, said selection means specifies that the outloaded pallet is filled by said filling means with said incoming goods.

8. An automated warehouse as defined in claim 6, wherein said computing means of said inloading/outloading controller comprises:

second occupancy volume computing means for computing an occupancy volume of incoming goods from a width, height, and depth of said incoming goods; and a command controller that compares the occupancy volume computed by said first occupancy volume computing means and the occupancy volume computed by said second occupancy volume computing means, and if said occupancy volume of said incoming goods is approximately equal to said occupancy volume of outloaded goods, said selection means specifies that the outloaded pallet is filled by said filling means with said incoming goods.

* * * * *